US009998056B2

(12) United States Patent
Nozawa (10) Patent No.: US 9,998,056 B2
(45) Date of Patent: Jun. 12, 2018

(54) POWER CONVERSION DEVICE FOR ELECTRIC VEHICLE

(71) Applicant: TOYOTA JIDOSHA KABUSHIKI KAISHA, Toyota-shi, Aichi-ken (JP)

(72) Inventor: Takashi Nozawa, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/629,060

(22) Filed: Jun. 21, 2017

(65) Prior Publication Data

US 2017/0373628 A1 Dec. 28, 2017

(30) Foreign Application Priority Data

Jun. 24, 2016 (JP) ................. 2016-125940

(51) Int. Cl.
| | |
|---|---|
| *F04D 15/00* | (2006.01) |
| *H02K 7/14* | (2006.01) |
| *H02P 27/06* | (2006.01) |
| *H02M 3/335* | (2006.01) |
| *H02M 7/537* | (2006.01) |
| *H02M 1/14* | (2006.01) |
| *B60K 6/28* | (2007.10) |
| *B60L 3/00* | (2006.01) |
| *B60L 11/18* | (2006.01) |
| *B60K 6/40* | (2007.10) |

(52) U.S. Cl.
CPC ............... *H02P 27/06* (2013.01); *B60K 6/28* (2013.01); *B60L 3/0046* (2013.01); *B60L 3/0084* (2013.01); *H02M 1/143* (2013.01); *H02M 3/33523* (2013.01); *H02M 7/537* (2013.01); *B60K 6/40* (2013.01); *B60L 11/1803* (2013.01); *B60Y 2200/92* (2013.01); *B60Y 2300/26* (2013.01); *B60Y 2400/61* (2013.01); *Y10S 903/907* (2013.01); *Y10S 903/951* (2013.01)

(58) Field of Classification Search
CPC .......... H02P 27/06; B60K 6/28; B60L 3/0046
USPC ............................................................ 318/3
See application file for complete search history.

(56) References Cited

FOREIGN PATENT DOCUMENTS

| JP | 2015-073353 A | 4/2015 |
|---|---|---|
| JP | 2017-095071 A | 6/2017 |

*Primary Examiner* — Erick Glass
(74) *Attorney, Agent, or Firm* — Sughrue Mion, PLLC (57) ABSTRACT

A power conversion device includes a main battery, an auxiliary battery, an inverter circuit, a high-voltage wiring, a smoothing capacitor, a main wiring, a subsidiary wiring, a DC-DC converter and a controller. The DC-DC converter is connected to a high-potential wire of the main wiring, a low-potential wire of the main wiring, a high-potential wire of the subsidiary wiring, a low-potential wire of the subsidiary wiring, the high-potential wire of the high-voltage wiring and the low-potential wire of the high-voltage wiring. The controller is connected to the auxiliary battery and the DC-DC converter. The DC-DC converter is configured to supply a power stored in the smoothing capacitor to the controller through the DC-DC converter such that the controller drives the inverter circuit and that the power stored in the smoothing capacitor is supplied to the motor through the inverter circuit, when a collision of the vehicle is detected.

4 Claims, 6 Drawing Sheets

POWER CONVERSION DEVICE FOR ELECTRIC VEHICLE

INCORPORATION BY REFERENCE

The disclosure of Japanese Patent Application No. 2016-125940 filed on Jun. 24, 2016 including the specification, drawings and abstract is incorporated herein by reference in its entirety.

BACKGROUND

1. Technical Field

The present specification discloses an art regarding a power conversion device that converts a power of a battery into a driving power of a motor for running.

2. Description of Related Art

A power conversion device of an electric vehicle is equipped with an inverter circuit that converts a DC power of a main battery into an AC power and that supplies this AC power to a motor for running. Besides, the power conversion device is equipped with a step-up converter circuit that steps up a voltage of a main battery before supplying the voltage to the inverter circuit. The power conversion device converts the DC power of the main battery into a driving power of the motor through the use of the inverter circuit and the step-up converter circuit.

In the power conversion device, with a view to suppressing pulsations of an output voltage resulting from the turning ON/OFF of a switching element of the step-up converter circuit, a smoothing capacitor is arranged between the step-up converter circuit and the inverter circuit. The smoothing capacitor has a large capacity, so there is a demand to swiftly discharge the smoothing capacitor in the event of a collision of the vehicle.

In Japanese Patent Application Publication No. 2015-73353 (JP 2015-73353 A), there is disclosed an art of discharging a smoothing capacitor in the event of a collision of a vehicle. A power conversion device of Japanese Patent Application Publication No. 2015-73353 (JP 2015-73353 A) causes a power of the smoothing capacitor to flow to a motor through an inverter circuit, thereby discharging the smoothing capacitor. Power is usually supplied to a controller that controls the inverter circuit, from an auxiliary battery that supplies power to auxiliaries such as an air-conditioner and the like. In the event of a collision, however, there may arise a situation where no power is supplied to the controller of the inverter circuit from the auxiliary battery, due to the breakage of the auxiliary battery, the disconnection between the auxiliary battery and the controller for the inverter circuit, or the like. The power conversion device of Japanese Patent Application Publication No. 2015-73353 (JP 2015-73353 A) is equipped with a backup power supply that is utilized in the event of a collision, in order to reliably supply power to the controller for the inverter circuit in the event of a collision.

SUMMARY

It is preferable not to mount a backup power supply, which is not used for normal running. The present disclosure provides a power conversion device capable of supplying power to a controller for an inverter circuit from a component other than an auxiliary battery without using a backup power supply.

A power conversion device according to one aspect of the present disclosure includes a main battery, an auxiliary battery, a step-up converter circuit, an inverter circuit, a high-voltage wiring, a smoothing capacitor, a main wiring, a subsidiary wiring, a DC-DC (direct current-direct current) converter and a controller. The auxiliary battery has a lower voltage than the main battery. The step-up converter circuit is connected to the main battery. The step-up converter circuit is configured to step up a voltage of the main battery. The inverter circuit is connected to the step-up converter circuit. The inverter circuit is configured to convert an output of the step-up converter circuit into an alternate current and output the alternate current to a motor for running of a vehicle. The high-voltage wiring connects the step-up converter circuit and the inverter circuit to each other. The smoothing capacitor is connected between a high-potential wire of the high-voltage wiring and a low-potential wire of the high-voltage wiring. The main wiring connects the main battery and the step-up converter circuit to each other. The subsidiary wiring is connected to the auxiliary battery. The DC-DC converter is connected to a high-potential wire of the main wiring, a low-potential wire of the main wiring, a high-potential wire of the subsidiary wiring, a low-potential wire of the subsidiary wiring, the high-potential wire of the high-voltage wiring and the low-potential wire of the high-voltage wiring. The controller is connected to the auxiliary battery and the DC-DC converter. The controller is configured to drive the inverter circuit. The DC-DC converter is configured to supply a power stored in the smoothing capacitor to the controller through the DC-DC converter such that the controller drives the inverter circuit and that the power stored in the smoothing capacitor is supplied to the motor through the inverter circuit, when a collision of the vehicle is detected.

At the time of running, a large power is stored in the large-capacity smoothing capacitor. With the power conversion device according to the aforementioned aspect of the present disclosure, in the event of a collision of the vehicle, the inverter circuit is driven through the use of the power of the smoothing capacitor. Thus, the power of the smoothing capacitor can be supplied to the motor through the inverter circuit. Then, even when a dedicated backup power supply is not used to drive the inverter circuit, the power for driving the inverter circuit can be supplied to the inverter circuit from the smoothing capacitor.

The power conversion device according to the aspect of the present disclosure has the step-up converter and the inverter circuit, and discharges the smoothing capacitor, which is connected to the inverter circuit, in case of an emergency. In the event of a collision of the vehicle, the inverter circuit can be driven through the use of the power of the smoothing capacitor. Thus, there is no need to mount the vehicle with a backup power supply for driving the inverter circuit in the event of a collision of the vehicle. Thus, the weight of the vehicle can be reduced. The details and further improvements of the art disclosed by the present specification will be described hereinafter in "DETAILED DESCRIPTION OF EMBODIMENTS".

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
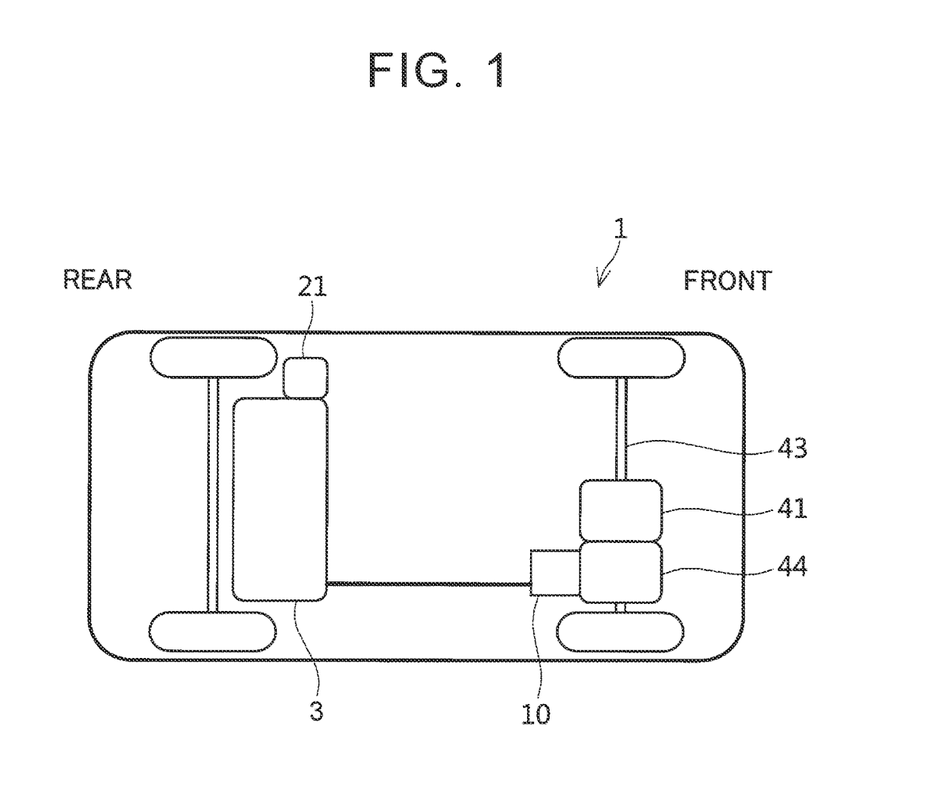
FIG. 1 is a schematic block diagram of a hybrid vehicle according to the embodiments of the present disclosure.
Figure 2:
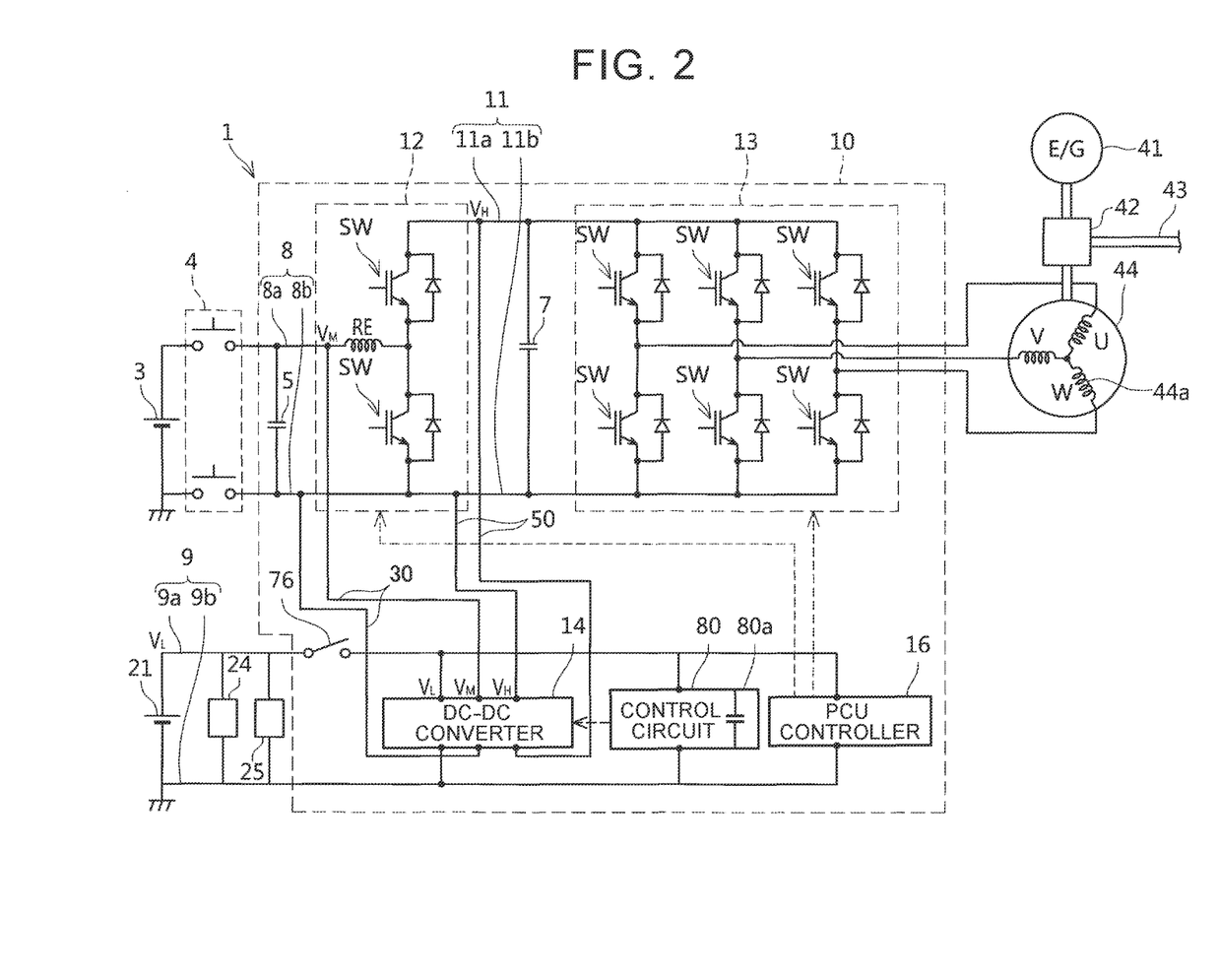
FIG. 2 is a block diagram of an electric system and a drive system of the hybrid vehicle according to the embodiments of the present disclosure.

As shown in FIGS. 1 and 2, a power control unit 10 (hereinafter referred to as "a PCU 10") according to the present embodiments of the present disclosure is mounted in a hybrid vehicle 1. The hybrid vehicle 1 is equipped with an engine 41 and a motor 44 as drive sources for running. An output torque of the engine 41 and an output torque of the motor 44 are appropriately distributed/synthesized by a motive power distribution mechanism 42 (see FIG. 2), and are transmitted to an axle 43 (i.e., wheels). Incidentally, FIGS. 1 and 2 represent only components that are needed to describe the art focused on by the present specification, and some components that are irrelevant to the description of the art are not shown in these drawings.

A power for driving the motor 44 is supplied from a main battery 3. The motor 44 is equipped with a three-phase coil 44a that is incorporated in a stator. The output voltage of the main battery 3 is, for example, 300 V. In addition to the main battery 3, the hybrid vehicle 1 is also equipped with an auxiliary battery 21 for supplying power to a group of devices that are driven at a lower voltage than the output voltage of the main battery 3, such as an air-conditioner 24, an airbag system 25 and the like. These devices will be comprehensively referred to hereinafter as "an auxiliary". Signal processing circuits other than a large-current system circuit of the PCU 10 (a PCU controller 16 that generates a PWM signal, etc.) also belong to the auxiliary. A control circuit 80 and the PCU controller 16, which will be described later, also belong to the auxiliary. As will be described later, the control circuit 80, the PCU controller 16 and a DC-DC converter 14 are connected to the auxiliary battery 21 via an auxiliary-side switch 76. Besides, the appellations "main battery" and "auxiliary battery" are used for the sake of convenience in distinguishing the two batteries from each other.

The main battery 3 is connected to the PCU 10 via a system main relay 4 and a high-potential wire 8a of a main wiring 8 and a low-potential wire 8b of the main wiring 8. The system main relay 4 is a switch that connects and disconnects the main battery 3 and a drive train of the vehicle. The PCU 10 steps up a DC power of the main battery 3, converts the stepped-up DC power into an AC power, and supplies this AC power to the motor 44. The PCU 10 is equipped with a step-up converter circuit 12 and an inverter circuit 13. The step-up converter circuit 12 is connected to the main battery 3 via the high-potential wire 8a, the low-potential wire 8b and the system main relay 4.

The step-up converter circuit 12 is constituted of two switching elements SW, a reactor RE, and diodes that are connected in an antiparallel manner to the switching elements SW respectively. The step-up converter circuit 12 is connected to the inverter circuit 13 via a high-potential wire 11a and a low-potential wire 11b of a high-voltage wiring 11. The inverter circuit 13 is constituted of six switching elements SW and diodes that are connected in an antiparallel manner to the switching elements SW respectively. The switching elements SW are typically transistors (IGBT's).

Besides, the PCU 10 is equipped with a capacitor 5 that smoothens a voltage input to the step-up converter circuit 12, and a capacitor 7 that smoothens a voltage input to the inverter circuit 13 (a voltage stepped up by the step-up converter circuit 12). The capacitor 5 is connected between the high-potential wire 8a and the low-potential wire 8b. The capacitor 7 is connected between the high-potential wire 11a and the low-potential wire 11b. These capacitors 5 and 7 are provided to remove high-frequency pulsations (noise) that are superimposed on voltages by turning ON/OFF the switching elements SW.

The PCU 10 handles a large current, so the capacitors 5 and 7 also have large capacities. It is not preferable that large quantities of power be indefinitely stored in the capacitors 5 and 7 after a stop of the vehicle, in the event of a collision of the vehicle, etc. Thus, in the event of a collision of the vehicle, the PCU 10 swiftly discharges the power stored in each of the capacitors 5 and 7 via the motor 44. In more concrete terms, when a collision of the vehicle is detected, the PCU 10 causes the power stored in each of the capacitors 5 and 7 to flow to the three-phase coil 44a of the motor 44 through the inverter circuit 13, and discharges each of the capacitors 5 and 7. In other words, the three-phase coil 44a of the motor is utilized as a discharge resistor. Incidentally, at the time of discharge, the capacitors 5 and 7 are discharged through such a path that no rotational torque is generated in the motor 44.

The switching elements SW with which the step-up converter circuit 12 and the inverter circuit 13 are equipped are controlled by the PCU controller 16 built into the PCU 10. In concrete terms, the PCU controller 16 receives an output target of the motor 44 from a comprehensive controller (not shown) that comprehensively controls the vehicle, and generates and supplies PWM signals for driving the respective switching elements SW such that the output target is realized. Incidentally, the comprehensive controller determines the output target of the motor 44 from a throttle opening degree, a vehicle speed, a remaining capacity of the main battery 3 and the like. Besides, as described previously, upon receiving a signal indicating the operation of an airbag from the airbag system 25, the PCU controller 16 discharges the capacitors 5 and 7 via the motor 44. The airbag system is equipped with an accelerator sensor. When the acceleration of the vehicle exceeds a predetermined threshold, the airbag system determines that the vehicle has collided, operates the airbag, and outputs a signal indicating the operation of the airbag.

The PCU 10 is further equipped with the DC-DC converter 14. The DC-DC converter 14 is a so-called bidirectional DC-DC converter that can step down the power of the main battery 3 and supply the stepped-down power to the auxiliary battery 21 side, and that can also step up the power of the auxiliary battery 21 and supply the stepped-up power to the main battery 3 side. The operation of the DC-DC converter 14 is controlled by the control circuit 80.

Figure 3:
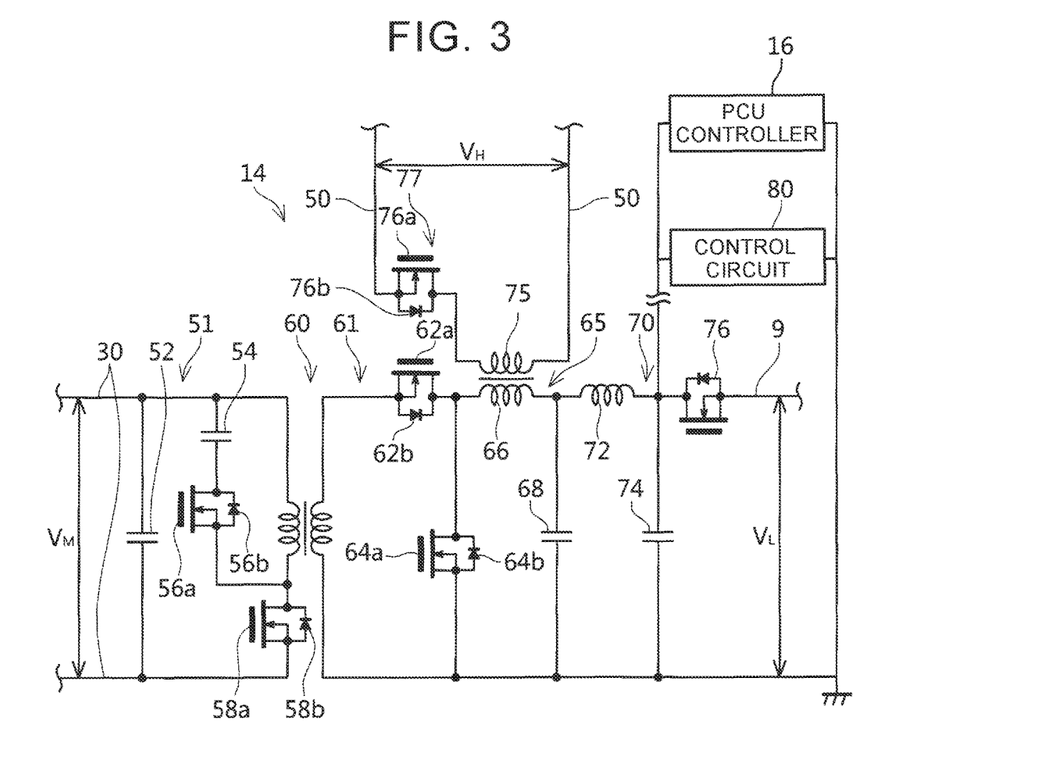
FIG. 3 is a circuit diagram of a DC-DC converter according to the first embodiment of the present disclosure.

As shown in FIG. 3, the DC-DC converter 14 is a so-called insulation-type converter that is equipped with a transformer 60. In addition to the transformer 60, the DC-DC converter 14 is equipped with a main battery-side circuit 51, an auxiliary battery-side circuit 61, the control circuit 80 and the auxiliary-side switch 76. The main battery-side circuit 51 is connected to the high-potential wire 8a and the low-potential wire 8b of the main wiring 8 via a wiring 30. The main battery-side circuit 51 is equipped with a filter 52, a capacitor 54, switching elements 56a and 58a, and diodes 56b and 58b. The filter 52 is a capacitor that suppresses the generation of noise on the main wiring 8 side.

The capacitor 54, the switching elements 56a and 58a and the diodes 56b and 58b are arranged between the filter 52 and the transformer 60. The switching element 56a and the diode 56b are connected in parallel to each other. The switching element 58a and the diode 58b are connected in parallel to each other.

The main battery-side circuit 51 is coupled to the auxiliary battery-side circuit 61 via the transformer 60. The auxiliary battery-side circuit 61 is equipped with switching elements 62a and 64a, diodes 62b and 64b, a rectifier circuit 65 and a smoothing circuit 70. The switching element 62a and the diode 62b are connected in parallel to each other. The switching element 64a and the diode 64b are connected in parallel to each other. The rectifier circuit 65 is connected between the switching element 62a and the switching element 64a. The rectifier circuit 65 is equipped with a coil 66 and a capacitor 68. The coil 66 functions as a choke coil (i.e., an inductor) of the rectifier circuit 65. The smoothing circuit 70 is arranged on the subsidiary wiring 9 side of the rectifier circuit 65. The smoothing circuit 70 is equipped with a coil 72 and a capacitor 74. The rectifier circuit 65 and the smoothing circuit 70 rectify a power flowing from the main wiring 8 toward the subsidiary wiring 9 by the DC-DC converter 14, and smoothens the power. The auxiliary-side switch 76 is arranged on the subsidiary wiring 9 side of the smoothing circuit 70. The auxiliary-side switch 76 is equipped with a switching element 76a and a diode 76b. The auxiliary-side switch 76 is changed over between a state where power can be supplied from the auxiliary battery-side circuit 61 to the subsidiary wiring 9 and a state where power cannot be supplied from the auxiliary battery-side circuit 61 to the subsidiary wiring 9, by turning ON/OFF the switching element 76a. The auxiliary battery-side circuit 61 is connected to the auxiliary battery 21 via the high-potential wire 9a and the low-potential wire 9b of the subsidiary wiring 9.

The switching elements 56a, 58a, 62a, 64a and 76a are controlled by the control circuit 80. In concrete terms, the control circuit 80 turns ON/OFF the switching elements 56a, 58a, 62a, 64a and 76a by transmitting signals thereto. Through the turning ON/OFF of the switching elements 56a and 58a by the control circuit 80, the DC-DC converter 14 steps down the voltage of the main wiring 8, and supplies the stepped-down voltage to the subsidiary wiring 9. Besides, through the turning ON/OFF of the switching elements 62a and 64a by the control circuit 80, the DC-DC converter 14 steps up the voltage of the subsidiary wiring 9, and supplies the stepped-up voltage to the main wiring 8.

Besides, the control circuit 80 is connected to the auxiliary battery 21 via the auxiliary-side switch 76, the high-potential wire 9a of the subsidiary wiring 9, and the low-potential wire 9b of the subsidiary wiring 9. While the auxiliary-side switch 76 is ON, the auxiliary battery 21 serves as an operating power supply. The control circuit 80 has a capacitor 80a that stores a power for driving the control circuit 80 for a short time in the case where the auxiliary-side switch 76 is turned OFF and the control circuit 80 is stopped from being supplied with power.

The DC-DC converter 14 is further equipped with a high-voltage power-side circuit 77. The high-voltage power-side circuit 77 is connected to the high-potential wire 11a of the high-voltage wiring 11 and the low-potential wire 11b of the high-voltage wiring 11, between the step-up converter circuit 12 and the capacitor 7, via a wiring 50. The high-voltage power-side circuit 77 is equipped with the switching element 76a, the diode 76b and a coil 75. The switching element 76a and the diode 76b are connected in parallel to each other. The switching element 76a is connected in series to the coil 75. The coil 75 is magnetically coupled to the coil 66 of the rectifier circuit 65 through an iron core. The coil 75, the iron core and the coil 66 constitute a transformer. A voltage of the high-voltage power-side circuit 77 is stepped down and supplied to the auxiliary battery-side circuit 61. The stepped-down voltage is also supplied to the PCU controller 16 and the control circuit 80.

As shown in FIG. 2, the auxiliary battery 21 is connected to auxiliaries such as the air-conditioner 24, the airbag system 25, a car navigation device, a room lamp, the comprehensive controller and the like. Besides, the foregoing PCU controller 16, the foregoing DC-DC converter 14 and the foregoing control circuit 80 are also supplied with power from the auxiliary battery 21 via the subsidiary wiring 9 and the auxiliary-side switch 76.

Next, a process of the hybrid vehicle 1 in the event of a collision of the vehicle will be described. In the event of a collision of the vehicle, the PCU controller 16 drives the inverter circuit 13, and causes the motor 44 (the three-phase coil 44a) to consume (discharge) the power stored in each of the capacitors 5 and 7. At the time of discharge, the inverter circuit 13 is controlled in such a manner as to discharge a path in which no rotational torque is generated in the motor 44. Therefore, the PCU controller 16 must continue to generate a PWM signal for driving the inverter circuit 13 until the discharge of the capacitors 5 and 7 is completed after detection of a collision. The PCU controller 16 is usually supplied with power from the auxiliary battery 21. However, the subsidiary wiring 9 is laid all over a body of the vehicle, and may be cut off in the event of a collision. The PCU controller 16 may be stopped from being supplied with power from the auxiliary battery 21 due to the cutoff of the subsidiary wiring 9 or the breakage of the auxiliary battery 21 itself.

In the hybrid vehicle 1, when a collision is detected, the power stored in each of the capacitors 5 and 7 is supplied to the PCU controller 16 via the DC-DC converter 14, and the inverter circuit 13 continues to operate.

Figure 4:
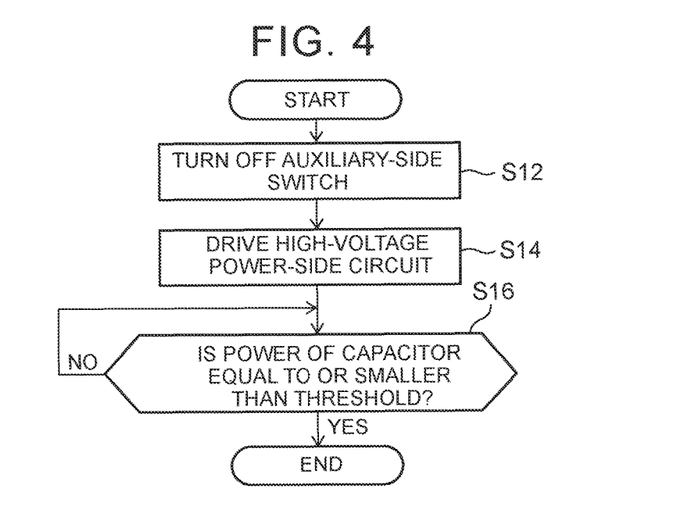
FIG. 4 is a flowchart of a discharge process in the event of detection of a collision according to the first embodiment of the present disclosure.

Next, a discharge process that is carried out by the control circuit 80 when a collision is detected will be described. When a system of the hybrid vehicle 1 is activated, the auxiliary-side switch 76 is turned ON, and the auxiliaries such as the PCU controller 16, the control circuit 80 and the like are supplied with power from the auxiliary battery 21. Besides, as the situation demands, the control circuit 80 causes the DC-DC converter 14 to drive the main battery-side circuit 51 and the auxiliary battery-side circuit 61, and ensures the transfer of power between the main wiring 8 and the subsidiary wiring 9. When the system of the hybrid vehicle 1 is activated, the control circuit 80 monitors the occurrence of a collision. In concrete terms, the control circuit 80 determines that "a collision" has occurred, when a measured value of an acceleration sensor with which the airbag system 25 is equipped exceeds a predetermined threshold. When a signal of airbag operation (a signal indicating a collision) is delivered to the PCU controller 16 from the airbag system 25, the discharge process of FIG. 4 is activated.

In the discharge process, in S12, the control circuit 80 turns OFF the auxiliary-side switch 76 that has been ON. Thus, the auxiliary battery 21 is shut off from the DC-DC converter 14, the PCU controller 16 and the control circuit 80. The control circuit 80 is driven for a short time by the capacitor 80a, which is mounted in the control circuit 80. Subsequently in S14, the control circuit 80 drives the high-voltage power-side circuit 77. In concrete terms, the control circuit 80 controls the turning ON/OFF of the switching element 76a. At this time, in the case where the main battery-side circuit 51 is driven, the high-voltage power-side circuit 77 is driven after stopping the main battery-side circuit 51. As a result, the power stored in each of the capacitors 5 and 7 is stepped down by the transformer of each of the coils 75 and 66, and is supplied to the auxiliary battery-side circuit 61. Thus, the power of each of the capacitors 5 and 7 is supplied to the control circuit 80 and the PCU controller 16.

Upon being supplied with power, the PCU controller 16 drives the inverter circuit 13, and causes the motor 44 (the three-phase coil 44a) to consume (i.e., discharge) the power stored in each of the capacitors 5 and 7. Incidentally, this processing procedure is carried out by the PCU controller 16, and hence is not mentioned in the flowchart of FIG. 4 showing the operation of the control circuit 80. Subsequently in S16, the control circuit 80 monitors that the power stored in the capacitor 7 becomes equal to or smaller than a threshold. In concrete terms, the control circuit 80 determines that the power stored in the capacitor 7 has become equal to or smaller than the threshold (YES in S16) when a detected value of a voltage sensor (not shown) that detects a voltage value of the capacitor 7 is equal to or lower than a predetermined value (e.g., 60 V). If YES in S16, the control circuit 80 stops the high-voltage power-side circuit 77, and ends the discharge process.

In the aforementioned discharge process, the power stored in each of the capacitors 5 and 7 is supplied to the control circuit 80 and the PCU controller 16, and the DC-DC converter 14 and the PCU controller 16 are driven. According to this configuration, the inverter circuit 13 can be supplied with power from a component other than the auxiliary battery 21, without using a dedicated backup power supply for driving the PCU controller 16.

Besides, the DC-DC converter 14 can be configured by adding the high-voltage power-side circuit 77 to a bidirectional DC-DC converter.

Incidentally, when there arises a situation where power cannot be exchanged between the main wiring 8 and the subsidiary wiring 9 through the use of the DC-DC converter 14, for example, when a malfunction occurs in the main battery-side circuit 51 of the DC-DC converter 14 during normal running, the PCU 10 may drive the high-voltage power-side circuit 77. Thus, the power stored in each of the capacitors 5 and 7 may be supplied to the subsidiary wiring 9 to cause the hybrid vehicle 1 to carry out evacuation running.

Second Embodiment

Figure 5:
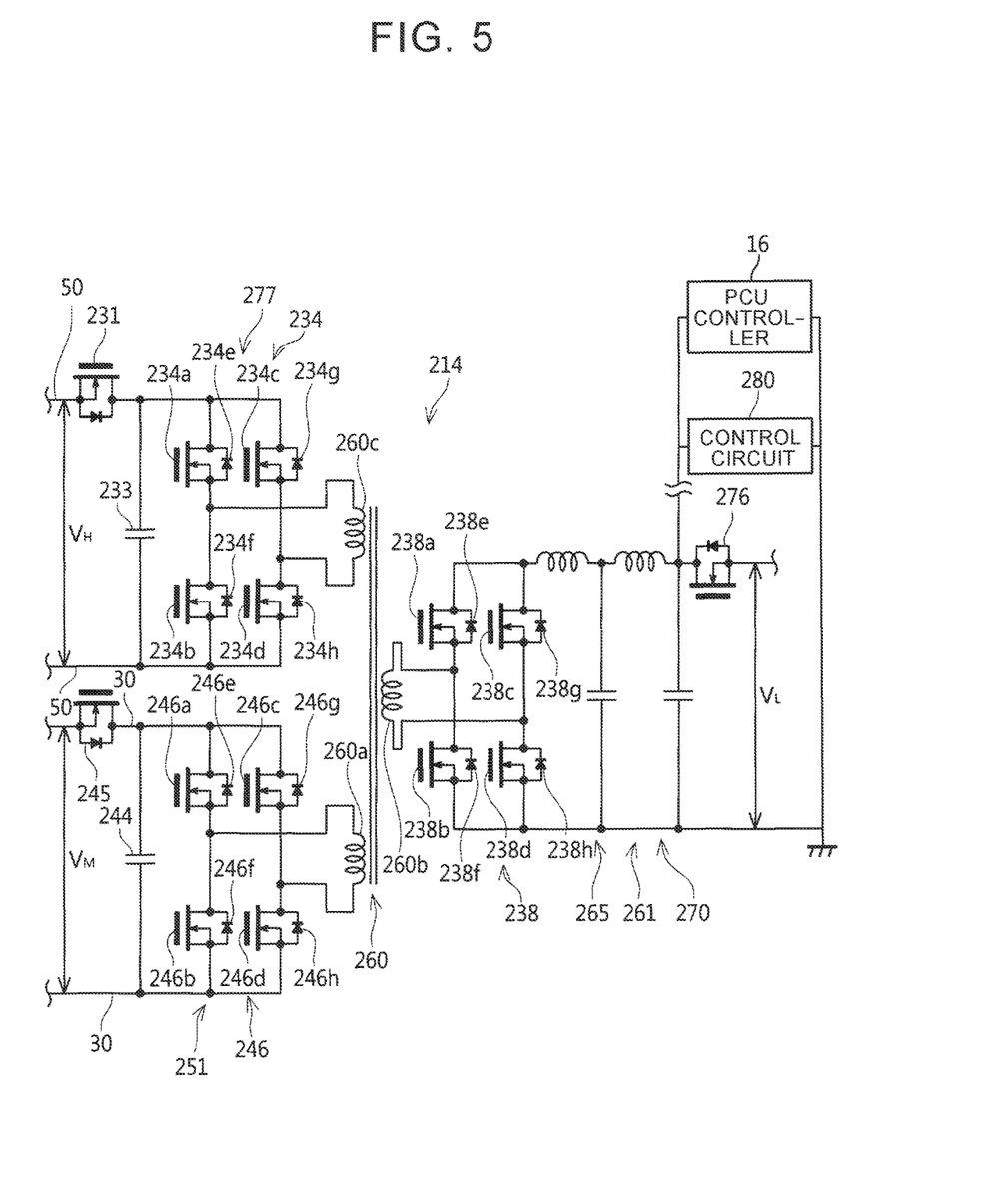
FIG. 5 is a circuit diagram of a DC-DC converter according to the second embodiment of the present disclosure.

What is different from the first embodiment of the present disclosure will be described with reference to FIG. 5. The PCU 10 according to the second embodiment of the present disclosure has a DC-DC converter 214, which is different in configuration from the DC-DC converter 14 according to the first embodiment of the present disclosure. The second embodiment of the present disclosure is identical in other configurational details to the first embodiment of the present disclosure, so the description thereof will be omitted.

The DC-DC converter 214 is a bidirectional DC-DC converter among three power supplies, and is an insulation-type converter that is equipped with a transformer 260. The DC-DC converter 214 is equipped with a main battery-side circuit 251, an auxiliary battery-side circuit 261, a high-voltage power-side circuit 277, the transformer 260, an auxiliary-side switch 276 and a control circuit 280. The auxiliary-side switch 276 is identical in configuration to the auxiliary-side switch 76.

The main battery-side circuit 251 is connected to the high-potential wire 8a of the main wiring 8 and the low-potential wire 8b of the main wiring 8 via the wiring 30. The main battery-side circuit 251 is arranged between the main wiring 8 and the transformer 260. The transformer 260 is connected to the auxiliary battery-side circuit 261 as well. The DC-DC converter 214 can also perform both a step-down operation for supplying power from the main wiring 8 to the subsidiary wiring 9 in a stepped-down manner and a step-up operation for supplying power from the subsidiary wiring 9 to the main wiring 8 in a stepped-up manner, due to the combination of the main battery-side circuit 251, the transformer 260 and the auxiliary battery-side circuit 261. That is, the DC-DC converter 214 is a so-called bidirectional DC-DC converter, and can be referred to as a step-up/step-down DC-DC converter.

The main battery-side circuit 251 is equipped with a filter 244, a switching circuit 246 and a backflow prevention switch 245. The filter 244 is equipped with a capacitor similar to that of the filter 52. The backflow prevention switch 245 makes a changeover between a state where power can be supplied from the main battery-side circuit 251 to the main wiring 8 (i.e., a state where a switching element is ON) and a state where power cannot be supplied from the main battery-side circuit 251 to the main wiring 8 (i.e., a state where the switching element is OFF) by turning ON/OFF the switching element.

The switching circuit 246 is equipped with switching elements 246a, 246b, 246c and 246d, and recirculation diodes 246e, 246f, 246g and 246h that are connected in parallel to the switching elements 246a, 246b, 246c and 246d respectively. The switching element 246a and the switching element 246b are connected in series to each other. The switching element 246c and the switching element 246d are connected in series to each other.

The switching circuit 246 is connected to the transformer 260. The transformer 260 is equipped with three coils 260a, 260b and 260c. The coil 260a is connected to the switching circuit 246. The coil 260b is connected to a switching circuit 234 of the auxiliary battery-side circuit 261. The coil 260c is connected to a switching circuit 238 of the high-voltage power-side circuit 277. In the transformer 260, power can be supplied from the coil 260a to the coil 260b in a stepped-down manner, and power can also be supplied from the coil 260b to the coil 260a in a stepped-up manner. Furthermore, in the transformer 260, power can also be supplied from the coil 260c to the coil 260b in a stepped-down manner.

The coil 260a is connected at one end thereof between the switching element 246a and the switching element 246b, and the coil 260a is connected at the other end thereof between the switching element 246c and the switching element 246d.

The auxiliary battery-side circuit 261, which is connected to the coil 260b, is connected to the high-potential wire 9a of the subsidiary wiring 9 and the low-potential wire 9b of the subsidiary wiring 9. The auxiliary battery-side circuit 261 is equipped with the switching circuit 238, a rectifier circuit 265 and a smoothing circuit 270. The rectifier circuit 265 is equipped with a coil and a capacitor that are similar to those of the rectifier circuit 65. The smoothing circuit 270 is equipped with a coil and a capacitor in the same manner as the smoothing circuit 70.

The switching circuit 238 is equipped with switching elements 238a, 238b, 238c and 238d, and recirculation diodes 238e, 238f, 238g and 238h that are connected in parallel to the switching elements 238a, 238b, 238c and 238d respectively. The switching element 238a and the switching element 238b are connected in series to each other. The switching element 238c and the switching element 238d are connected in series to each other. The coil 260b is connected at one end thereof between the switching element 238a and the switching element 238b, and the coil 260b is connected at the other end thereof between the switching element 238c and the switching element 238d.

The high-voltage power-side circuit 277, which is connected to the coil 260c, is connected to the high-potential wire 11a of the high-voltage wiring 11 and the low-potential wire 11b of the high-voltage wiring 11 via the wiring 50. The high-voltage power-side circuit 277 is equipped with a filter 233, the switching circuit 234 and a backflow prevention switch 231. The filter 233 is equipped with a capacitor that suppresses the generation of noise on the high-voltage wiring 11 side. The backflow prevention switch 231 makes a changeover between a state where power can be supplied from the high-voltage wiring 11 to the high-voltage power-side circuit 277 (a state where a switching element is ON) and a state where power cannot be supplied from the high-voltage wiring 11 to the high-voltage power-side circuit 277 (a state where the switching element is OFF) by turning ON/OFF the switching element.

The switching circuit 234 is equipped with switching elements 234a, 234b, 234c and 234d, and recirculation diodes 234e, 234f, 234g and 234h that are connected in parallel to the switching elements 234a, 234b, 234c and 234d respectively. The switching element 234a and the switching element 234b are connected in series to each other. The switching element 234c and the switching element 234d are connected in series to each other. The coil 260c is connected at one end thereof between the switching element 234a and the switching element 234b. The coil 260c is connected at the other end thereof between the switching element 234c and the switching element 234d.

The main battery-side circuit 251, the auxiliary battery-side circuit 261 and the high-voltage power-side circuit 277 are controlled by the control circuit 280. In concrete terms, the control circuit 280 controls the operations of the switching elements 246a, 246b, 246c and 246d of the switching circuit 246, the switching elements 234a, 234b, 234c and 234d of the switching circuit 234, the switching elements 238a, 238b, 238c and 238d of the switching circuit 238, the backflow prevention switches 245 and 231, and the auxiliary-side switch 276.

The control circuit 280 usually drives the main battery-side circuit 251 and the auxiliary battery-side circuit 261 to perform either the step-down operation or the step-up operation. In performing the step-down operation, the switching elements 246a, 246b, 246c and 246d operate in the switching circuit 246 of the main battery-side circuit 251 to convert a DC power supplied from the main wiring 8 into an AC power. Then, an AC voltage obtained through conversion is stepped down in the transformer 260. The AC power is converted into a DC power by the auxiliary battery-side circuit 261.

On the other hand, in performing the step-up operation, the switching elements 238a, 238b, 238c and 238d operate in the switching circuit 238 of the auxiliary battery-side circuit 261 to convert a DC power supplied from the subsidiary wiring 9 into an AC power. Then, an AC voltage obtained through conversion is stepped up in the transformer 260. The AC power is converted into a DC power by the main battery-side circuit 251.

The control circuit 280 can usually prevent power from being inadvertently supplied to the high-voltage wiring 11, by turning OFF the backflow prevention switch 231 of the high-voltage power-side circuit 277.

On the other hand, in the event of a collision, the control circuit 280 drives the high-voltage power-side circuit 277 and the auxiliary battery-side circuit 261 to perform the step-down operation. Thus, the power of each of the capacitors 5 and 7 is supplied to the subsidiary wiring 9 side via the DC-DC converter 214. In concrete terms, in the switching circuit 234 of the high-voltage power-side circuit 277, the switching elements 234a, 234b, 234c and 234d operate to convert a DC power supplied from the high-voltage wiring 11 into an AC power. Then, an AC voltage obtained through conversion is stepped down in the transformer 260. The AC power is converted into a DC power by the auxiliary battery-side circuit 261.

In the event of a collision, the control circuit 280 can prevent power from being inadvertently supplied to the main wiring 8, by turning OFF the backflow prevention switch 245 of the main battery-side circuit 251.

The discharge process that is carried out by the control circuit 280 of the DC-DC converter 214 when a collision is detected will be described. When a signal indicating a collision is delivered to the PCU controller 16 from the airbag system, the discharge process is activated. The control circuit 280 carries out the discharge process in the same processing procedure as in the discharge process of FIG. 3. As a result, when a collision is detected, the power stored in each of the capacitors 5 and 7 is supplied to the control circuit 280 and the PCU controller 16 in the DC-DC converter 214, through the step-down operation of the high-voltage power-side circuit 277, the transformer 260 and the auxiliary battery-side circuit 261.

In this configuration, the DC-DC converter 214 can be configured by adding the high-voltage power-side circuit 277 to the bidirectional DC-DC converter. Thus, the power of each of the capacitors 5 and 7 can be stepped down and supplied to the subsidiary wiring 9.

Third Embodiment

Figure 6:
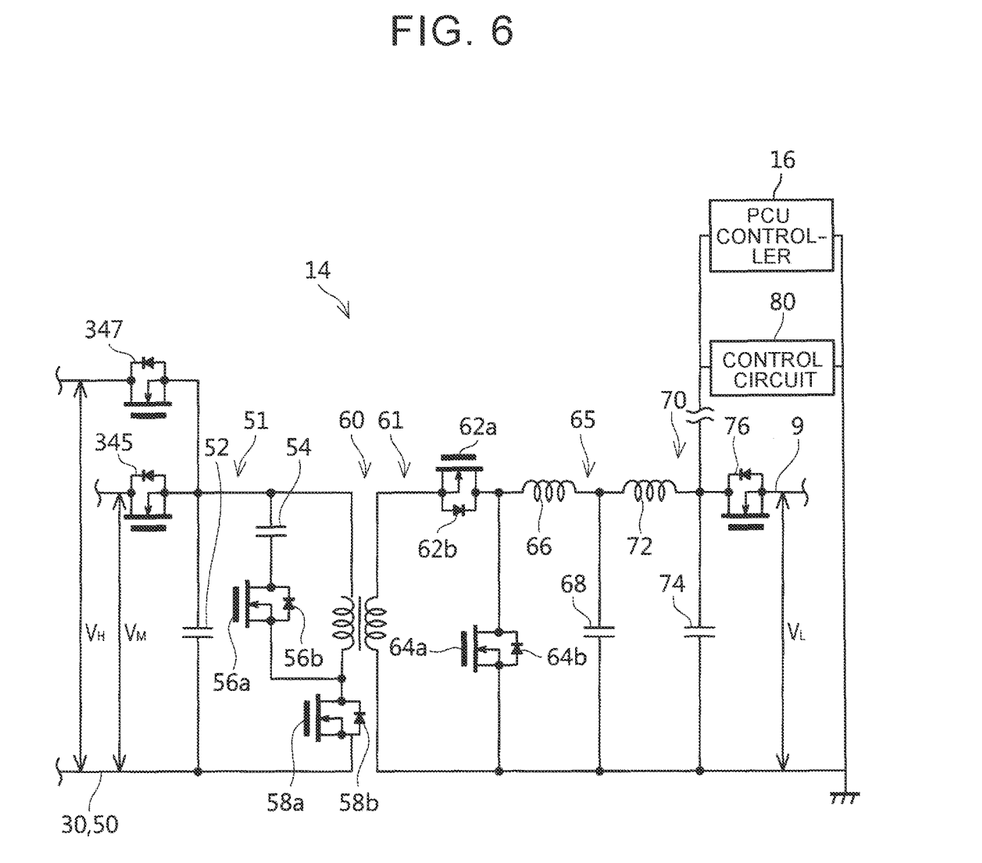
FIG. 6 is a circuit diagram of a DC-DC converter according to the third embodiment of the present disclosure.

What is different from the first embodiment of the present disclosure will be described with reference to FIG. 6. The hybrid vehicle 1 according to the third embodiment of the present disclosure has a DC-DC converter 314, which is different in configuration from the DC-DC converter 14 according to the first embodiment of the present disclosure. The third embodiment of the present disclosure is identical in other configurational details to the first embodiment of the present disclosure, so the description thereof will be omitted.

The DC-DC converter 314 is equipped with the main battery-side circuit 51, the transformer 60 and the auxiliary battery-side circuit 61, which are similar to those of the DC-DC converter 14. On the other hand, the DC-DC converter 314 is not equipped with a circuit corresponding to the high-voltage power-side circuit 77 of the DC-DC converter 14. On the other hand, in the DC-DC converter 314, the high-voltage wiring 11 and the main battery-side circuit 51 are connected to each other via the wiring 50. The DC-DC converter 314 is further equipped with a high voltage-side switch 347 that is arranged between the high-voltage wiring 11 and the main battery-side circuit 51, and a main-side switch 345 that is arranged between the main wiring 8 and the main battery-side circuit 51.

In the main-side switch 345, a switching element and a diode are connected in parallel to each other. The main-side switch 345 is controlled by the control circuit 80 to be turned ON/OFF. When the main-side switch 345 is ON, power can be supplied from the main wiring 8 to the main battery-side circuit 51. When the main-side switch 345 is OFF, power cannot be supplied from the main wiring 8 to the main battery-side circuit 51. The main-side switch 345 is usually held ON.

In the high voltage-side switch 347, a switching element and a diode are connected in parallel to each other. The high voltage-side switch 347 is controlled by the control circuit 80 to be turned ON/OFF. When the high voltage-side switch 347 is ON, power can be supplied from the high-voltage wiring 11 to the main battery-side circuit 51. When the high voltage-side switch 347 is OFF, power cannot be supplied from the high-voltage wiring 11 to the main battery-side circuit 51. The high voltage-side switch 347 is held OFF.

Figure 7:
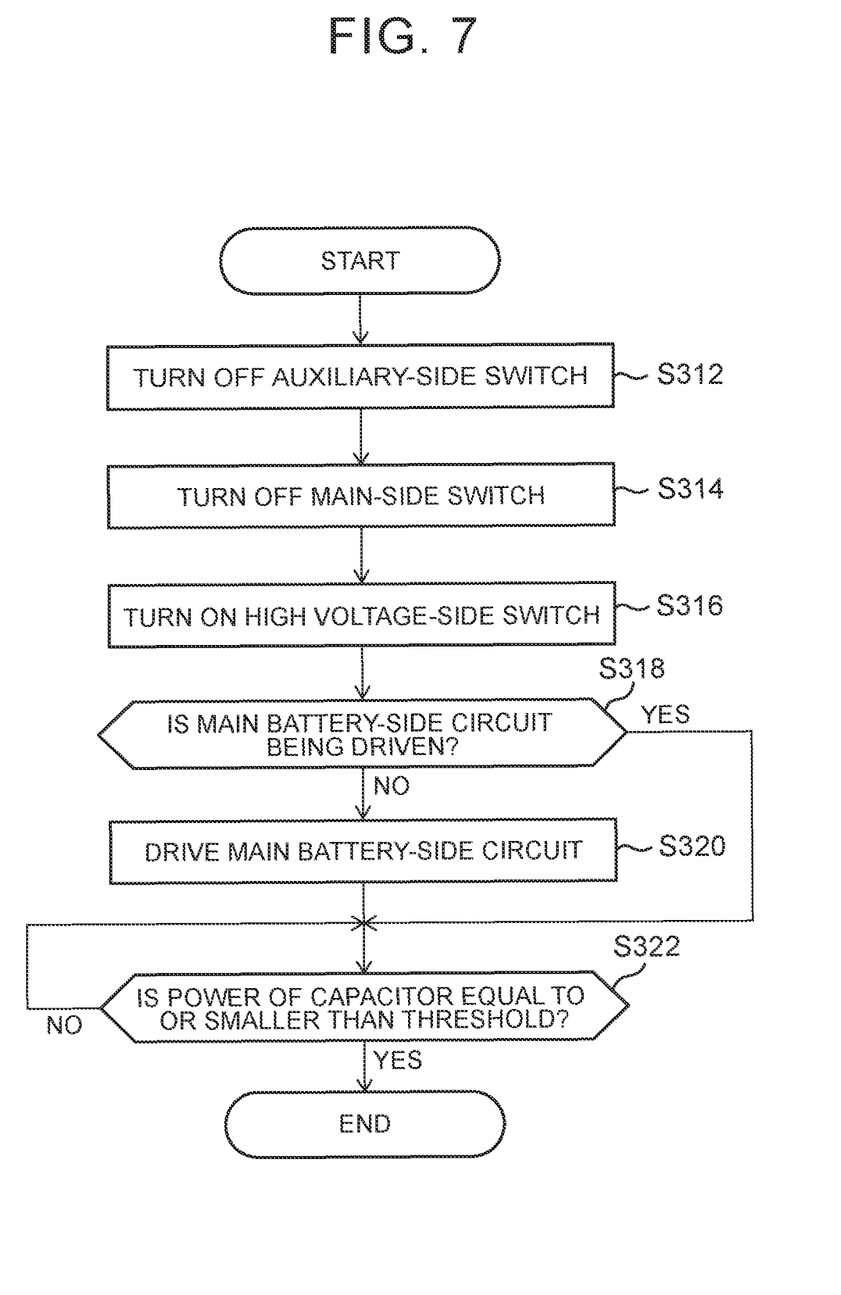
FIG. 7 is a flowchart of a discharge process in the event of detection of a collision according to the third embodiment of the present disclosure.

A discharge process that is carried out by the control circuit 80 of the DC-DC converter 314 when a collision is detected will be described with reference to FIG. 7. As is the case with the first embodiment of the present disclosure, when a collision is detected, the discharge process is started. First of all in S312 as well as S12, the control circuit 80 turns OFF the auxiliary-side switch 76 that has been ON. Subsequently in S314, the control circuit 80 turns OFF the main-side switch 345 that has been ON. Subsequently in S316, the control circuit 80 turns ON the high voltage-side switch 347 that has been OFF.

Subsequently in S318, the control circuit 80 determines whether or not the main battery-side circuit 51 is driven. In concrete terms, the control circuit 80 determines whether or not the ON/OFF states of the switching elements 56*a* and 58*a* of the main battery-side circuit 51 are controlled. Then, if the ON/OFF states of the switching elements 56*a* and 58*a* are not controlled, the control circuit 80 determines that the main battery-side circuit 51 is not driven (NO in S318), drives the main battery-side circuit 51 in S320, and makes a transition to S322.

On the other hand, if the ON/OFF states of the switching elements 56*a* and 58*a* are controlled, the control circuit 80 determines that the main battery-side circuit 51 is driven (YES in S318), skips S320, and makes a transition to S322. In S322, the control circuit 80 carries out a process similar to that of S16 of the first embodiment of the present disclosure.

According to this configuration, the DC-DC converter 314 can be configured by adding the main-side switch 345 and the high voltage-side switch 347 to the bidirectional DC-DC converter.

The concrete examples of the present disclosure, which have been described above in detail, are nothing more than exemplifications and do not limit the claims. The art set forth in the claims encompasses various modifications and alterations of the concrete examples exemplified above. The technical elements described in the present specification or the drawings are technically useful either alone or in various combinations, and are not limited to the combination set forth in the claims at the time of filing. Besides, the art exemplified in the present specification or the drawings can achieve a plurality of objects at the same time, and is technically useful simply by achieving one of the objects.

The main features of the embodiments of the present disclosure described below will be mentioned. Incidentally, the technical elements that will be described hereinafter are independent of one another. These technical elements are technically useful either alone or in various combinations, and are not limited to the combination set forth in the claims at the time of filing.

(Feature 1) In the power conversion device disclosed in the present specification, a DC-DC converter may be connected to a high-potential wire of a subsidiary wiring and a low-potential wire of the subsidiary wiring. The DC-DC converter may be equipped with a rectifier circuit having a first coil and a capacitor, and a second coil that is connected to a smoothing capacitor and that is magnetically coupled to the first coil. When a collision of a vehicle is detected, the DC-DC converter may step down a power stored in the smoothing capacitor through the use of the first coil and the second coil, and supply the stepped-down power to a controller. According to this configuration, a transformer can be configured using the first coil and the second coil. Thus, the power supplied from the smoothing capacitor can be stepped down.

(Feature 2) In the power conversion device disclosed in the present specification, a DC-DC converter may be equipped with a transformer including a third coil that is connected to a high-potential wire of a main wiring and a low-potential wire of the main wiring, a fourth coil that is connected to a high-potential wire of a subsidiary wiring and a low-potential wire of the subsidiary wiring, and a fifth coil that is connected to a smoothing capacitor. When a collision of a vehicle is detected, the DC-DC converter may step down the power stored in the smoothing capacitor through the transformer, and supply the stepped-down power to a controller. According to this configuration, the transformer can be commoditized to step up/step down the power on the main wiring side and the power on the subsidiary wiring side, and step down the power supplied from the smoothing capacitor.

(Feature 3) In the power conversion device disclosed in the present specification, a DC-DC converter may be equipped with a first switch that makes a changeover between an energization state where a main battery and a DC-DC converter are energized and a non-energization state where the main battery and the DC-DC converter are not energized, and a second switch that makes a changeover between an energization state where a smoothing capacitor and the DC-DC converter are energized and a non-energization state where the smoothing capacitor and the DC-DC converter are not energized. When a collision of a vehicle is detected, the DC-DC converter may render the first switch in the non-energization state, render the second switch in the energization state, and supply the power stored in the smoothing capacitor to a controller through the second switch. According to this configuration, the power supplied from the smoothing capacitor can be supplied to the controller via the DC-DC converter, by making a changeover between the first switch and the second switch.

What is claimed is:
1. A power conversion device comprising:
a main battery;
an auxiliary battery that has a lower voltage than the main battery;

a step-up converter circuit that is connected to the main battery, the step-up converter circuit being configured to step up a voltage of the main battery;

an inverter circuit that is connected to the step-up converter circuit, the inverter circuit being configured to convert an output of the step-up converter circuit into an alternate current and output the alternate current to a motor for running of a vehicle;

a high-voltage wiring that connects the step-up converter circuit and the inverter circuit to each other;

a smoothing capacitor that is connected between a high-potential wire of the high-voltage wiring and a low-potential wire of the high-voltage wiring;

a main wiring that connects the main battery and the step-up converter circuit to each other;

a subsidiary wiring that is connected to the auxiliary battery;

a DC-DC converter that is connected to a high-potential wire of the main wiring, a low-potential wire of the main wiring, a high-potential wire of the subsidiary wiring, a low-potential wire of the subsidiary wiring, the high-potential wire of the high-voltage wiring and the low-potential wire of the high-voltage wiring;

a controller that is connected to the auxiliary battery and the DC-DC converter, the controller being configured to drive the inverter circuit, wherein the DC-DC converter is configured to supply a power stored in the smoothing capacitor to the controller through the DC-DC converter such that the controller drives the inverter circuit and that the power stored in the smoothing capacitor is supplied to the motor through the inverter circuit, when a collision of the vehicle is detected.

2. The power conversion device according to claim 1, wherein the DC-DC converter includes a rectifier circuit and a second coil, the rectifier circuit is connected between the high-potential wire of the subsidiary wiring and the low-potential wire of the subsidiary wiring, the rectifier circuit including a first coil and a capacitor, the second coil is connected to the smoothing capacitor, the second coil being configured to be magnetically coupled to the first coil, and the DC-DC converter is configured to step down the power stored in the smoothing capacitor through use of the first coil and the second coil, and supply the stepped-down power to the controller, when a collision of the vehicle is detected.

3. The power conversion device according to claim 1, wherein the DC-DC converter includes a transformer, the transformer including a third coil, a fourth coil and a fifth coil, the third coil being connected between the high-potential wire of the main wiring and the low-potential wire of the main wiring, the fourth coil being connected between the high-potential wire of the subsidiary wiring and the low-potential wire of the subsidiary wiring, and the fifth coil being connected between the high-potential wire of the high-voltage wiring and the low-potential wire of the high-voltage wiring, and the DC-DC converter is configured to step down the power stored in the smoothing capacitor through the transformer and supply the stepped-down power to the controller, when a collision of the vehicle is detected.

4. The power conversion device according to claim 1, wherein the DC-DC converter includes a first switch and a second switch, the first switch is configured to make a changeover between an energization state where the main battery and the DC-DC converter are energized and a non-energization state where the main battery and the DC-DC converter are not energized, the second switch is configured to make a changeover between an energization state where the smoothing capacitor and the DC-DC converter are energized and a non-energization state where the smoothing capacitor and the DC-DC converter are not energized, and the DC-DC converter is configured to render the first switch in the non-energization state and render the second switch in the energization state in such a manner as to supply the power stored in the smoothing capacitor to the controller through the second switch, when a collision of the vehicle is detected.

* * * * *